United States Patent
Heckman et al.

(10) Patent No.: US 8,805,365 B2
(45) Date of Patent: Aug. 12, 2014

(54) REGISTRATION WITH A MOBILE TELECOMMUNICATIONS SERVICE PROVIDER

(75) Inventors: Laura Heckman, San Francisco, CA (US); Arun Mathias, Sunnyvale, CA (US); Isabel Mahe, Los Altos, CA (US); Matthew Klahn, San Jose, CA (US); Brian Cassidy, San Francisco, CA (US); Jean-Marc Padova, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 209 days.

(21) Appl. No.: 12/892,472

(22) Filed: Sep. 28, 2010

(65) Prior Publication Data

US 2011/0177811 A1      Jul. 21, 2011

Related U.S. Application Data

(60) Provisional application No. 61/295,651, filed on Jan. 15, 2010, provisional application No. 61/298,525, filed on Jan. 26, 2010.

(51) Int. Cl.
*H04W 4/00* (2009.01)
*H04W 60/00* (2009.01)

(52) U.S. Cl.
CPC .................... *H04W 60/00* (2013.01)
USPC ....................................................... 455/435.1

(58) Field of Classification Search
CPC . H04W 60/00; H04W 60/005; H04W 60/002; H04W 60/04
USPC ........................... 455/405–409, 412.1, 412.2, 455/414.1–414.4, 418–422.1, 432.1–449, 455/456.1, 456.3, 457, 466, 550.1, 552.1, 455/553.1, 556.1, 556.2, 557, 560, 561; 370/310.2, 328, 331–333, 338, 370/352–356, 465–469

See application file for complete search history.

(56) References Cited

U.S. PATENT DOCUMENTS 6,970,694 B2     11/2005  Shaheen
7,184,764 B2 *   2/2007   Raviv et al. ................. 455/432.1

(Continued)

FOREIGN PATENT DOCUMENTS

WO       2008/133561      11/2008

OTHER PUBLICATIONS

PCT International Search Report and Written Opinion of the International Searching Authority mailed Sep. 15, 2011 for PCT/US10/52082 filed Oct. 8, 2010.

(Continued)

*Primary Examiner* — San Htun
(74) *Attorney, Agent, or Firm* — Park, Vaughan, Fleming & Dowler LLP

(57) ABSTRACT

A method performed by a mobile device to register for cellular data connection service provided by a mobile telecommunications service provider. The mobile device determines that it does not have a valid cellular data connection subscription with the mobile telecommunications service provider. Responsive to that determination, the mobile device connects to a cellular data connection service registration site to allow a user of the mobile device to register for data connection service provided by the mobile telecommunications service provider. The mobile device is limited to accessing the data connection service registration site until the user registers for data connection service.

12 Claims, 8 Drawing Sheets

(56) References Cited

U.S. PATENT DOCUMENTS

| | | | |
|---|---|---|---|
| 7,366,509 | B2 | 4/2008 | Akgun et al. |
| 7,386,301 | B2 | 6/2008 | Shaheen |
| 7,450,554 | B2 | 11/2008 | Zhang |
| 7,613,196 | B2 | 11/2009 | Stewart et al. |
| 2005/0131989 | A1* | 6/2005 | Beckmann et al. ........... 709/201 |
| 2005/0153683 | A1* | 7/2005 | Gustafsson ................... 455/411 |
| 2005/0157691 | A1 | 7/2005 | Stewart et al. |
| 2005/0227719 | A1 | 10/2005 | Gunaratnam et al. |
| 2005/0233740 | A1* | 10/2005 | Jiang .......................... 455/432.1 |
| 2006/0068829 | A1 | 3/2006 | Mecca |
| 2006/0168655 | A1 | 7/2006 | Grandmaitre et al. |
| 2006/0258356 | A1* | 11/2006 | Maxwell et al. .............. 455/436 |
| 2006/0262778 | A1 | 11/2006 | Haumont et al. |
| 2007/0254636 | A1* | 11/2007 | Jiang .......................... 455/414.1 |
| 2008/0293407 | A1 | 11/2008 | Cormier et al. |
| 2010/0080202 | A1* | 4/2010 | Hanson ........................ 370/338 |
| 2010/0157850 | A1* | 6/2010 | Horn et al. ................... 370/259 |

OTHER PUBLICATIONS

PCT International Preliminary Report on Patentability (Chapter I of the Patent Cooperation Treaty) for PCT/US2010/052082 mailed Jul. 26, 2012.

* cited by examiner

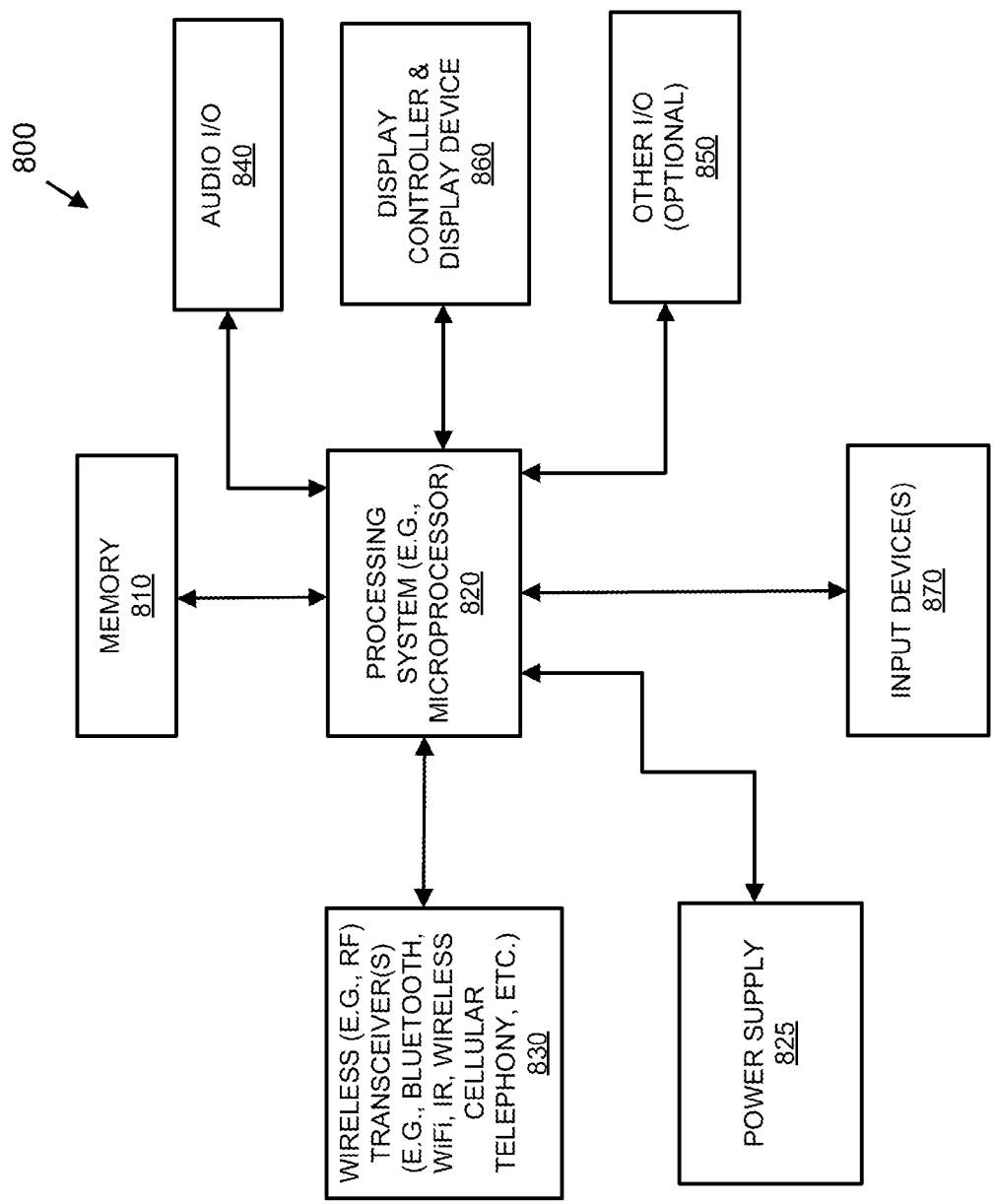

REGISTRATION WITH A MOBILE TELECOMMUNICATIONS SERVICE PROVIDER

CROSS-REFERENCE TO RELATED APPLICATIONS

This application claims the benefit of U.S. Provisional Application No. 61/295,651, filed Jan. 15, 2010, and U.S. Provisional Application No. 61/298,525, filed Jan. 26, 2010, which are hereby incorporated by reference in their entireties.

BACKGROUND

1. Field

Embodiments of the invention relate to the field of mobile telecommunications; and more specifically to improving registration with a mobile telecommunications service provider.

2. Background

Mobile devices (e.g., laptops, palmtops, mobile phones, smartphones, multimedia phones, tablets, portable media player, etc.), which are a form of data processing systems, commonly include the capability of connecting and using data services (e.g., through a cellular network, WiMAX, etc.) provided by mobile telecommunications service providers. Mobile device users are required to register (e.g., purchase, change, activate, etc.) for cellular data connection service with a mobile telecommunications service provider prior to being able to use the service provided by that service provider. For example, prior to a user being able to access the Internet using a cellular data connection of their mobile device, the user must register for that service with a mobile telecommunications service provider.

It is common for users to register for service when purchasing mobile devices. Users may also register or change cellular data connection service through a telephone or through the Internet. However, current mechanisms for registering for cellular data connection service for mobile devices through the Internet are performed through separate Internet connections (e.g., through a different computing device than the mobile device, through a Wi-Fi/LAN Internet connection of the mobile device, etc.).

SUMMARY

A method and apparatus for mobile devices registering with mobile telecommunications service providers is described. In one embodiment, a mobile device initially attempts to establish a cellular data connection with a network identified with a first access point name ("APN"). The first APN typically identifies a public network (e.g., the Internet). The request is processed by the cellular network that performs an authorization procedure to determine whether the mobile device is authorized to use the network identified by the first APN. If the mobile device is authorized, then a data connection will be established and the services provided through the first APN can be used. However, if the mobile device is not authorized, the cellular network transmits a message to the mobile device that indicates that the mobile device is not currently authorized. The message may indicate that the mobile device does not currently have a valid subscription for the first APN. Responsive to receiving such a message, the mobile device establishes a cellular data connection with a second network identified by a second APN. The second network is typically limited to a data connection service registration site that allows the user to register for cellular data connection service. The mobile device connects to the cellular data connection registration site thereby allowing the user to register for cellular data connection services (e.g., select and or purchase a cellular data rate plan, add/buy credits to a prepaid data rate plan, etc.).

BRIEF DESCRIPTION OF THE DRAWINGS

The invention may best be understood by referring to the following description and accompanying drawings that are used to illustrate embodiments of the invention. In the drawings:

FIG. 8 is a block diagram illustrating an exemplary data processing system which may be used in some embodiments of the invention.

DETAILED DESCRIPTION

Figure 1:
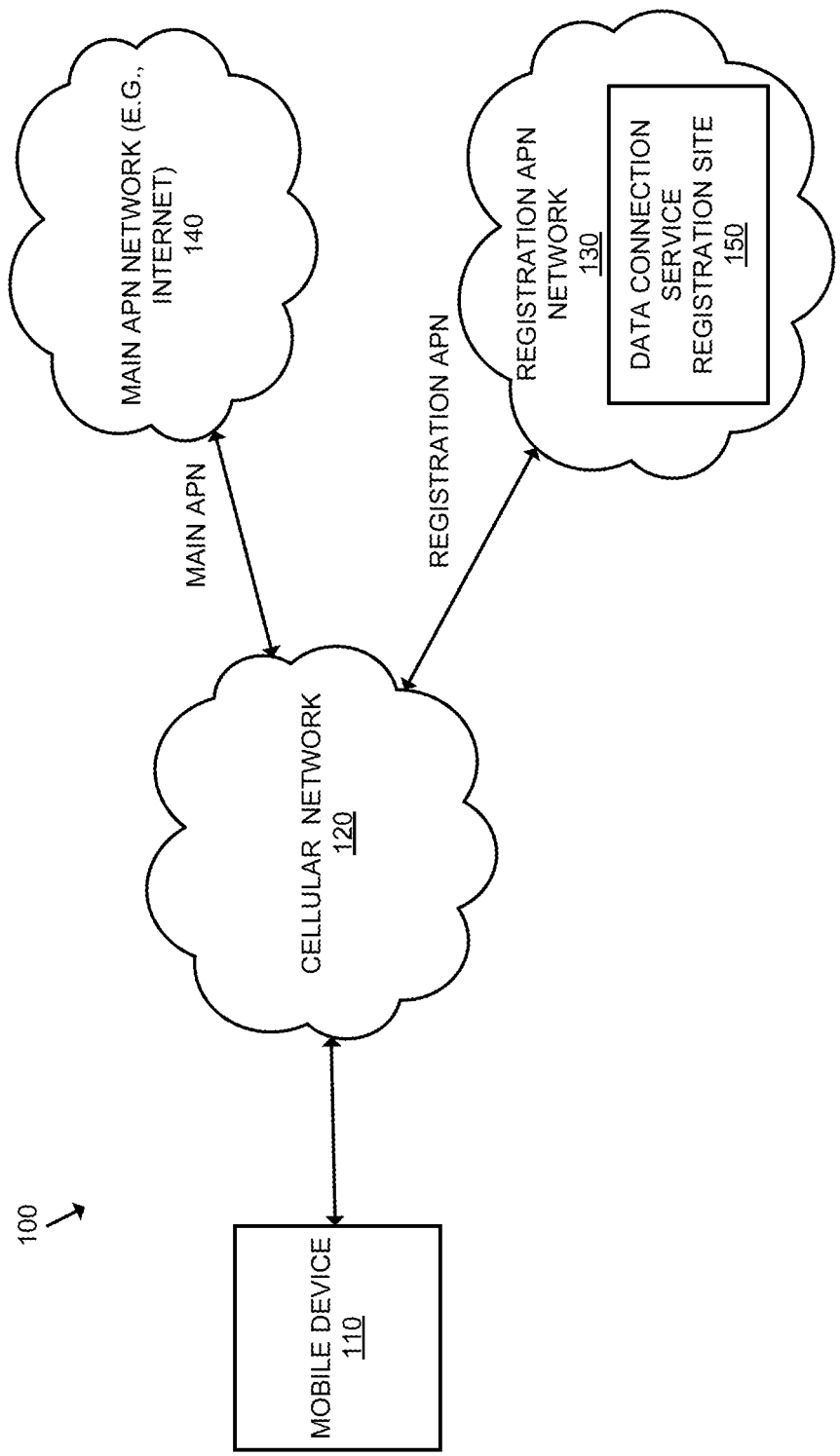
FIG. 1 illustrates an exemplary mobile telecommunications network according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

A method and apparatus for mobile devices registering with mobile telecommunications service providers is described. In one embodiment, a mobile device initially attempts to establish a cellular data connection (hereinafter "data connection") with a network identified by an access point name ("APN"). The initially identified APN is sometimes referred herein as the "main APN." The network identified by the main APN may be a public network (e.g., the Internet) or a private network (e.g., a corporate intranet, a wireless application protocol (WAP) service, a multimedia messaging service (MMS), etc.). The main APN is also associated with a set of implementation parameters (e.g., firewall rules, access control rules, cost, etc.). The cellular network performs an authorization procedure to determine whether the mobile device is authorized to access the network identified by the main APN. If the mobile device is authorized to use the network identified by the main APN, then a data connection will be established and the services provided by that network may be used. In some embodiments, the main APN may also requires a username and password prior to authorizing access.

However, if the mobile device is not authorized, the cellular network transmits an error message that indicates the mobile device is not authorized to access the network identified by the main APN (e.g., the mobile device is currently not subscribed to the services offered by the main APN, the mobile device currently does not have credit to access the services offered by the main APN, etc.). Responsive to receiving such an error message, the mobile device establishes a data connection with a different network identified by a different APN to allow the mobile device to access a registration site that allows a user to register for the services provided by the network identified by the main APN. This different APN is sometimes referred herein as the "registration APN." In some embodiments, the network identified by the registration APN is limited to a registration site. The mobile device connects to the registration site (e.g., via a mobile telecommunications service registration application (e.g., a web browser or other Internet enabled interface)) thereby allowing the user to register for services provided by the network identified by the main APN (e.g., select and/or purchase a data rate plan, add/buy credits for a prepaid data rate plan, etc.).

Sometime after the user registers for data connection service, the mobile device tears down the data connection to the registration APN and establishes a data connection with the network identified by the main APN (the mobile device will now be authorized to use the services). The mobile device may then be able to use the services provided by the network identified by the main APN.

FIG. 1 illustrates an exemplary mobile telecommunications network 100 according to one embodiment. As illustrated in FIG. 1, the mobile telecommunications network 100 includes the mobile device 110 coupled with the cellular network 120. The cellular network 120 may include technology for one or more of the following: a GSM (Global System for Mobile communications) network, a CDMA (Code Division Multiple Access) network, an iDEN (Integrated Digital Enhanced Network), an UMTS (Universal Mobile Telecommunications System) network, an EDGE (Enhanced Data rates for GSM Evolution) network, GPRS (General Packet radio Service), etc. The cellular network 120 includes multiple network elements. For example, the cellular network 120 includes base stations, base station controllers, core nodes (e.g., in GPRS, one or more GPRS support nodes), etc.

One or more mobile telecommunications service providers may own, operate, or lease certain parts of the cellular network 120.

The registration APN network 130 and the main APN network 140 and coupled to the cellular network 120. The main APN network 140, which is identified through the main APN, may be a public network (e.g., the Internet) or a private network (e.g., a corporate intranet, a wireless application protocol (WAP) service, a multimedia messaging service (MMS), etc.). In one embodiment, access to the main APN network 140 is specific to a particular mobile telecommunications service provider. That is, even though the main APN network 140 may be a public network (e.g., the Internet), access to the network 140 may be limited and controlled by a particular mobile telecommunications service provider. The registration APN network 130, which is identified through the registration APN, includes a set of restricted services including the data connection service registration site 150. The data connection service registration site 150 allows users to register for the services provided by the main APN network 140 (e.g., select and/or purchase a data rate plan, add/buy credits for a prepaid data rate plan, etc.) or other network. In one embodiment the set of restricted services are provided by the mobile telecommunications service provider controlling access to the main APN network 140, while in other embodiments the set of restricted services are provided by multiple mobile telecommunications service provider.

Figure 2:
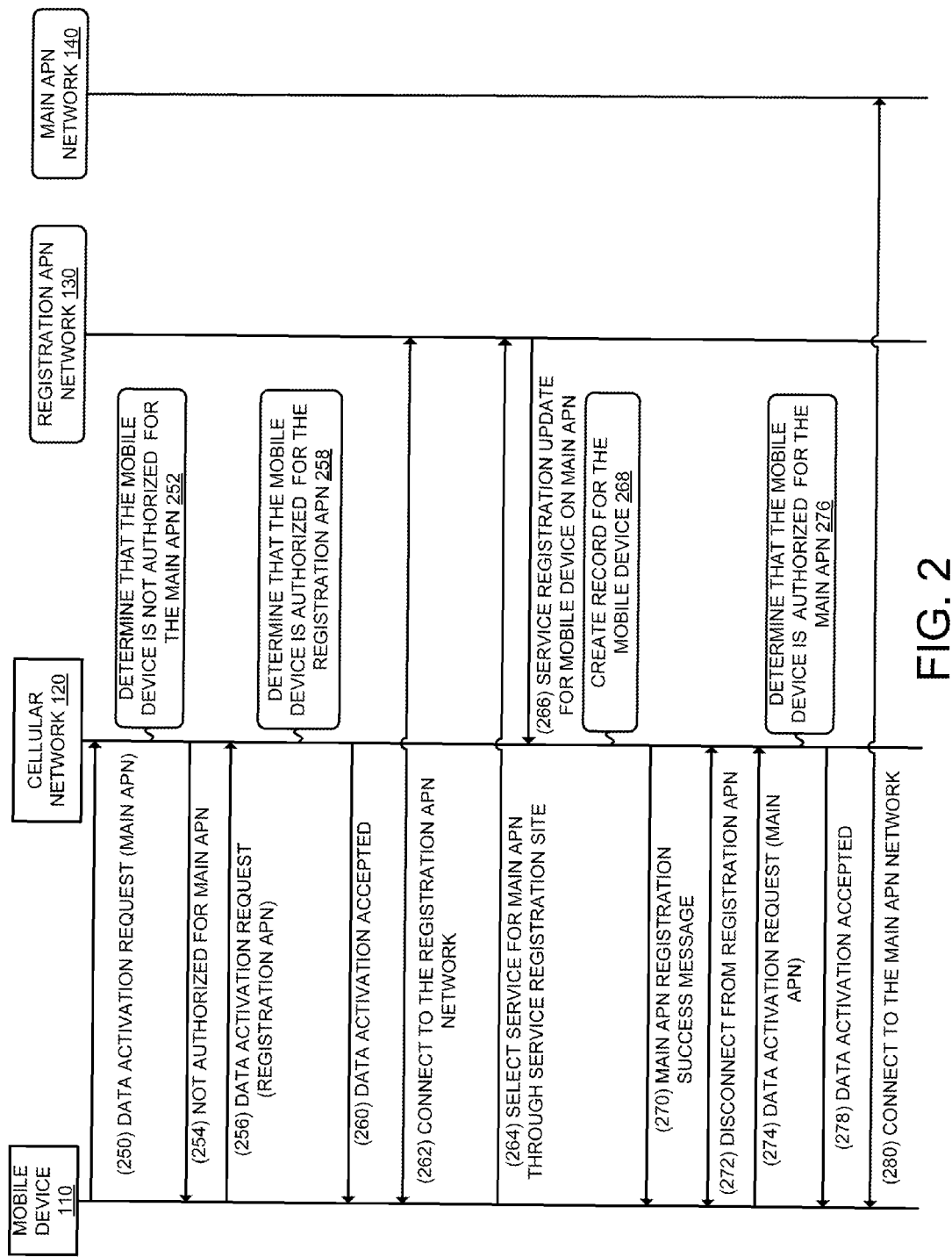
FIG. 2 is a data flow diagram illustrating exemplary operations for a mobile device registering for services provided by a mobile telecommunications service provider according to one embodiment.

FIG. 2 is a data flow diagram illustrating exemplary operations for a mobile device registering for data connection services provided by a mobile telecommunications service provider according to one embodiment. FIG. 2 will be described in relation to the exemplary embodiment of FIGS. 1 and 3.

Figure 3:
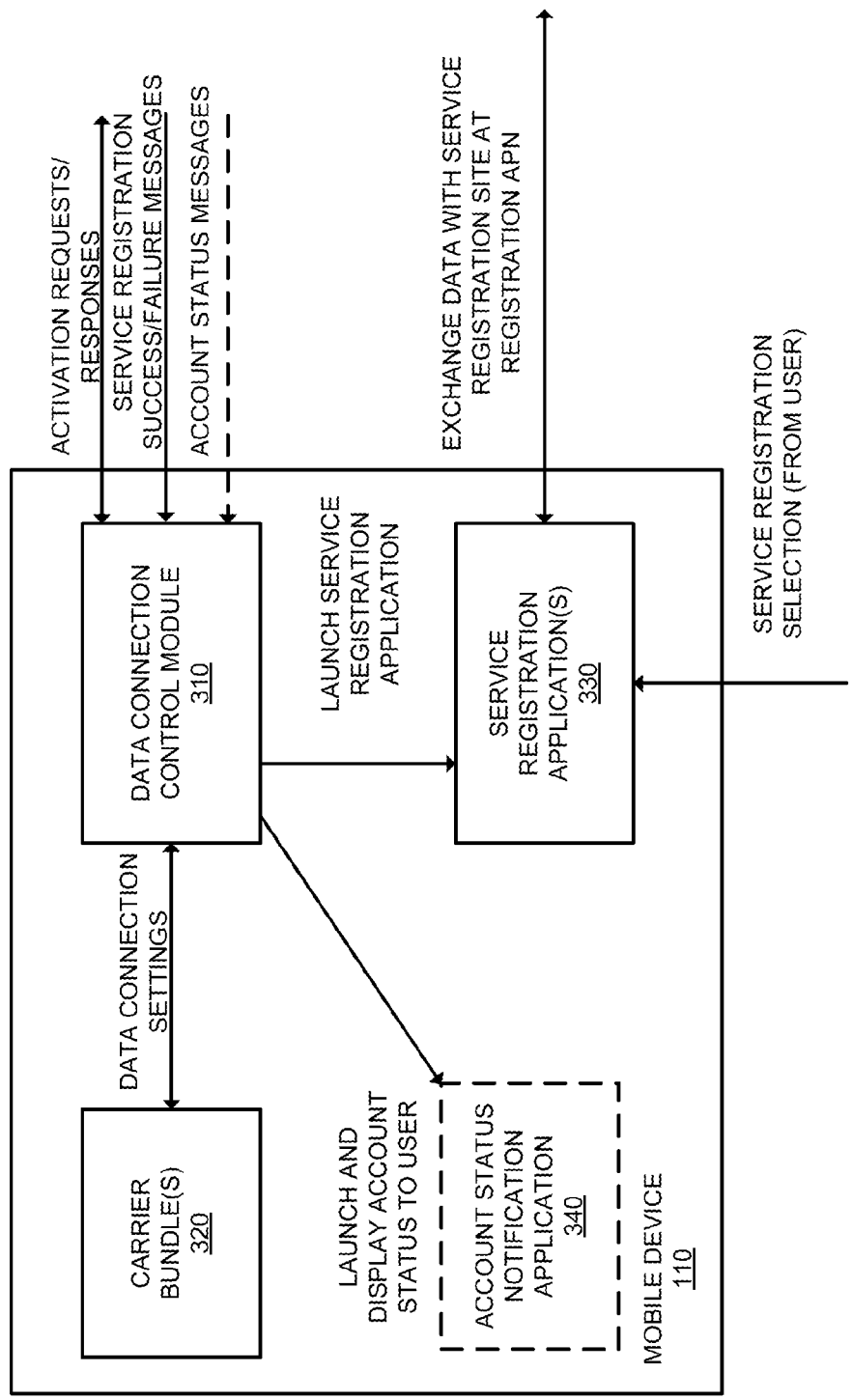
FIG. 3 is a block diagram illustrating an exemplary mobile device adapted to register for services provided by a mobile telecommunications service provider according to one embodiment.

FIG. 3 is a block diagram illustrating an exemplary mobile device adapted to register for data connection services provided by a mobile telecommunications service provider according to one embodiment. As illustrated in FIG. 3, the mobile device 110 includes the data connection control module 310, one or more carrier bundles 320, one or more service registration applications 330, and optionally an account status notification application 340.

At operation 250, the mobile device 110 attempts to establish a data connection through the main APN. For example, the mobile device 110 transmits a data activation request to the cellular network 120 for the main APN. The data activation request may also include a set of one or more other parameters (e.g., PDP (Packet Data Protocol) type, PDP address type, QoS profile request, IMSI (international mobile subscriber identity) of the SIM (subscriber identity module) card, etc.). The data activation request may be transmitted as a result of the mobile device 110 turning on, after the mobile device is within cellular service range, after data connectivity is requested by the user (e.g., opening a data connection application such as a browser), etc. With reference to FIG. 3, the data connection control module 310 controls the transmission of the data connection activation request. For example, the data connection control module 310 accesses the appropriate one of the carrier bundle(s) 320 to determine the value of the main APN and other parameters. Each of the carrier bundle(s) 320 includes one or more settings specific to a carrier (e.g., APN settings, MMS settings, and other settings relating to cellular telephony service). In one embodiment, the main APN is a default APN included in a default carrier bundle.

In some embodiments, users may purchase prepaid SIM cards that have been preloaded with an amount of credit for data service (e.g., a number of minutes, an amount of bandwidth, etc.) of a mobile telecommunications service provider.

The prepaid SIM cards must be activated before they can be used. SIM cards which are not yet activated for a given APN are sometimes known as warm SIM cards. In contrast, SIM cards which have been activated for that APN are sometimes known as hot SIM cards.

The cellular network 120 receives the data activation request and at operation 252, determines that the mobile device 110 is not presently authorized for a data connection through the main APN. In other words, the data connection establishment through the main APN has failed. In some embodiments the cellular network 120 includes a home location register (HLR) database, which includes records for each mobile device that is authorized to use the main APN. For example, the IMSI of the mobile device 110 is checked against the HLR records for the main APN. The mobile device 110 is not authorized to use the main APN if the IMSI of the mobile device 110 is not included in an HLR record or if a corresponding HLR record indicates that the mobile device 110 is not presently authorized (e.g., the mobile device does not have any minutes remaining in its plan, etc.).

Sometime after determining that the mobile device 110 is not presently authorized for the main APN, at operation 254 the cellular network 120 transmits a message to the mobile device 110 indicating so. In some embodiments, this message includes an error code that indicates the mobile device 110 does not have a valid data connection subscription for the main APN. With reference to FIG. 3, the data connection control module 310 receives the unauthorized message from the cellular network 120.

Sometime after receiving the unauthorized message, at operation 256 the mobile device 110 transmits a data activation request to the cellular network 120 that includes a registration APN, which identifies the registration APN network 130. Similar to the data activation request of operation 250, the data activation request of operation 256 may also include a set of one or more other parameters (e.g., PDP (Packet Data Protocol) type, PDP address type, QoS profile request, IMSI (international mobile subscriber identity), etc.). With reference to FIG. 3, after receiving the unauthorized message, the data connection control module 310 accesses the carrier bundle(s) 320 to determine the parameters and identity of the registration APN. In one embodiment, the registration APN is located in the same carrier bundle as the main APN. For example, if the mobile telecommunications service provider A is associated with the main APN, the carrier bundle for service provider A is accessed to determine the registration APN associated with the service provider A. In other embodiments, the registration APN is generic and is applicable to multiple mobile telecommunications service providers.

The cellular network 120 receives the data activation request and at operation 258 determines that the mobile device 110 is authorized to use the registration APN. In some embodiments, all mobile devices are authorized to use the registration APN, while in other embodiments only certain mobile devices (as identified by their IMSI) are authorized to use the registration APN. For example, a portion of each IMSI is typically assigned to a mobile telecommunications service provider (e.g., in the Mobile Network Code (MNC) portion of the IMSI). If the registration APN is operated or controlled by a particular mobile telecommunications service provider, that service provider may limit access to the registration APN to those mobile devices having IMSIs that include the MNC of that service provider.

After determining that the mobile device 110 is authorized for the registration APN, the cellular network 120 transmits a data activation accepted message to the mobile device 110 at operation 260. With reference to FIG. 3, the data connection control module 310 receives the data activation accepted message.

Sometime after receiving the data activation accepted message, at operation 262 the mobile device 110 connects to the registration APN network 130. As previously described, the registration APN network 130 is limited to a set of restricted services. For example, in one embodiment, the registration APN network 130 limits the mobile device 110 to accessing the data connection service registration site 150 where the user of the mobile device 110 may register for data connection service (e.g., for the main APN network 140). In some embodiments, connecting to the registration APN network 130 includes establishing a PDP (Packet Data Protocol) context for the registration APN.

In some embodiments, the mobile device 110 launches a data connection service registration application to connect to the registration APN network 130. For example, with reference to FIG. 3, the data connection control module 310 triggers the launch of one of the data connection service registration application(s) 330. The data connection service registration application(s) 330 connect to the network provided by the registration APN (e.g., the data connection service registration site 150) and allows users to register for data connection service. The data connection service registration application(s) 330 may include a web browser and/or other applications capable of accessing the network provided by the registration APN. In some embodiments, the service registration application(s) 330 are different for different mobile telecommunications service providers. For example, one or more of the service registration application(s) 330 may be designed and/or customized by a particular mobile telecommunications service provider and may operate differently than other ones of the service registration application(s) 330. For example, as will be described in greater detail with respect to FIG. 4, some of the data connection service registration application(s) 330 may be programmed to display a cancel button at certain times of the data connection registration process while other data connection service registration applications (s) 330 do not display a cancel button.

Figure 4:
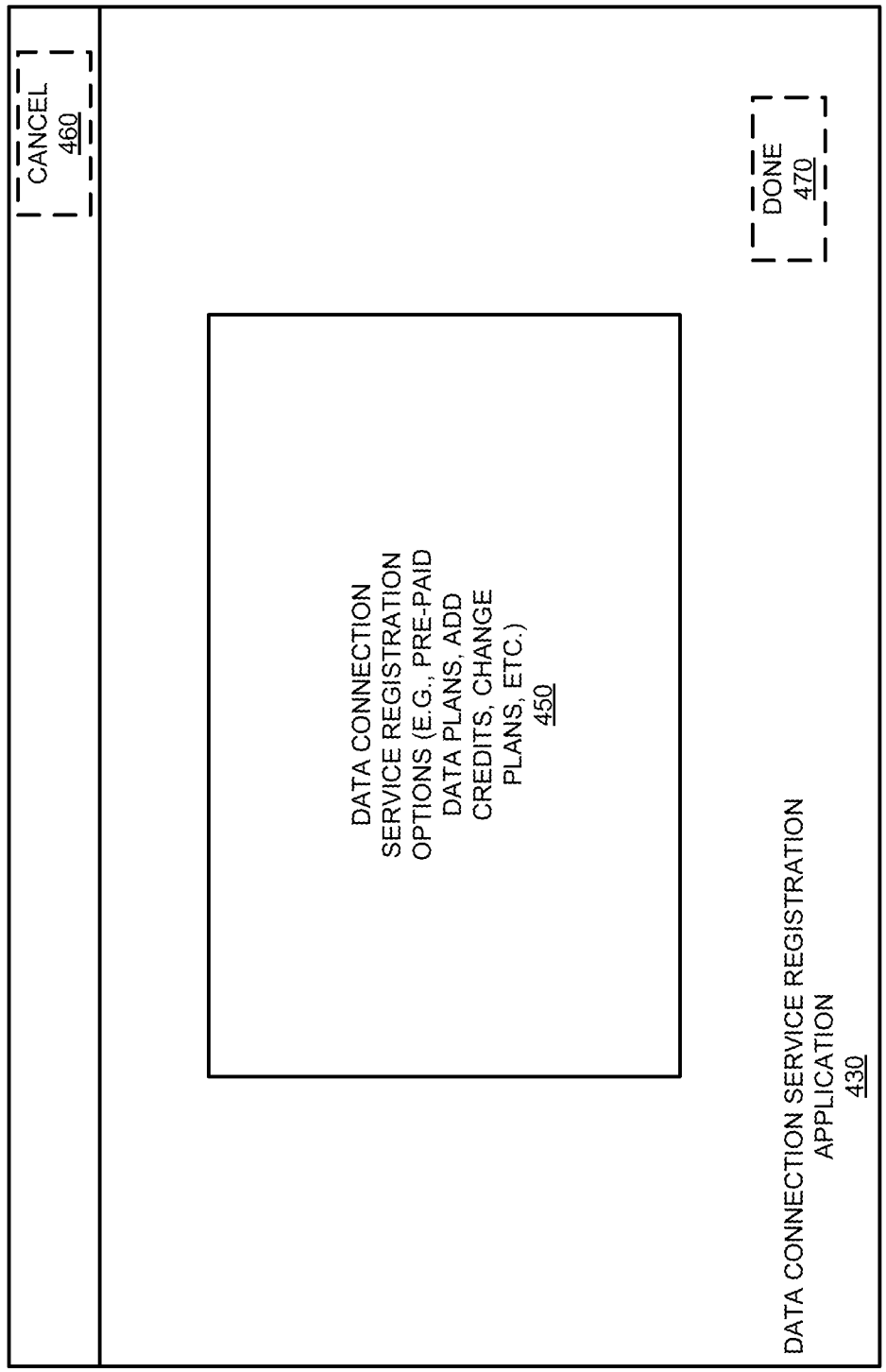
FIG. 4 is a block diagram illustrating an exemplary service registration application launched by the exemplary mobile device of FIG. 3 according to one embodiment.

An exemplary service registration application is illustrated in FIG. 4. As illustrated in FIG. 4, the service registration application 430 includes the data connection service registration options 450, and optionally the cancel button 460 and the done button 470. The cancel button 460 and the done button 470 will be described in greater detail later herein.

The data connection service registration options 450 include one or more data connection service options that the user can select from. By way of example, these options include registering for a new data plan (e.g., purchasing a number of minutes, purchasing an amount of bandwidth, etc.) and/or adding credits (e.g., minutes, bandwidth, etc.) to an existing data plan. The data connection service registration options 450 are typically specific for a particular mobile telecommunications service provider and only include registration options for that service provider. However, in some embodiments the registration APN is common to multiple telecommunications service providers. In such embodiments, the data connection service registration site 150 may provide data connection service registration options 450 for multiple mobile telecommunications service providers. Thus in these embodiments, the user of the mobile device 110 may compare/contrast and select data connection plans from multiple mobile telecommunications service providers. It should be understood that if the user selects or registers for services from a different mobile telecommunications service provider than is associated with the main APN, the mobile device 110 may be required to download or receive a carrier bundle for the selected mobile telecommunications service provider.

Although not illustrated in FIG. 4, it should be understood that the service registration application 430 may display additional items. For example, the service registration application 430 may display advertisements, news updates, weather updates, stock updates, etc. In addition, it should be understood that a user may navigate through several screens while registering for data connection services. For example, the data connection service registration site 150 may include several web pages (e.g., a registration page, a page regarding details of each plan, a profile page, a confirmation page, etc.).

In some embodiments, in addition to displaying the data connection service registration options 450, information may be displayed based on the approximate present location of the mobile device 110 (e.g., state, city, neighborhood, place (e.g., hotel, resort, airport, coffee shop, school, etc.), etc.). For example, the approximate location may be determined through use of GPS functionality built within the mobile device 110 and/or determined through triangulation using cellular towers or Wi-Fi hotspots. The mobile device 110 may transmit its approximate location to the registration APN network 140 after it is connected to the network 140.

For instance, if the mobile device 110 is determined to be presently located near a resort or hotel, information specific to that resort or hotel (e.g., related to services offered by the resort, information about the surrounding area, current weather, etc.) may be displayed in addition to the data connection service registration options 450. It should be understood that while the information specific to the resort is displayed, in some embodiments, the user is allowed to continue to register for services for the main APN. Thus while the user is waiting for the registration process to complete, the user may access pages or information specific to the location of the mobile device 110.

Referring back to FIG. 2, at operation 264, the user of the mobile device 110 has selected a service for the main APN through the data connection service registration site 150, and the selected service has been communicated to the service registration site 150. The mobile telecommunications service provider then completes the registration for the mobile device 110 for the selected service. For example, at operation 266, the registration APN network 130 transmits a service registration update to the cellular network 120 that includes information indicating that the mobile device 110 is registered for service through the main APN. Sometime after receiving this message, at operation 268 a record is created and/or updated for the mobile device 110 for the main APN network 140. For example, an HLR record for the IMSI of the SIM card of the mobile device 110 is created and stored in the HLR database. After the IMSI of the SIM has been placed into an HLR record, the SIM card is known as a hot SIM card and the mobile device 110 should be able to use the main APN network 140.

At operation 270, the mobile device 110 receives a data connection service registration success message from the cellular network 120 that indicates that registration was successful. With reference to FIG. 3, the data connection control module 310 receives the data connection service registration success message. In one embodiment, this message is an SMS message which is interpreted by the data connection control module 310. Upon receiving this message, the data connection control module 310 may cause an appropriate message to be displayed on the service registration application 330 or other window and/or cause the application 330 to close.

Although FIG. 2 illustrates the operation 270 occurring after the record for the mobile device was created, in other embodiments the cellular network 120 transmits a message after a predefined amount of time has elapsed (e.g., in case that the registration was not successful). For example, sometime after establishing a data connection through the registration APN, the cellular network 120 may start a timer based on the expected amount of time for a successful registration. If an HLR record for the mobile device 110 is not created or updated prior to that timer expiring, the cellular network 120 will transmit a message indicating that registration was not successful. With reference to FIG. 3, service registration failure messages are also received and interpreted by the data connection control module 310 (they may also be SMS messages). Upon receiving a service registration failure message, the data connection control module 310 may cause an appropriate message to be displayed on the service registration application 330 or other window.

Referring back to FIG. 2, sometime after receiving the service registration success message, at operation 272 the mobile device 110 disconnects from the registration APN. In one embodiment, this includes tearing down the PDP context to the registration APN. In one embodiment, this may be initiated by the mobile device 110 while in other embodiments this may be initiated by the cellular network 120. In either case, a data deactivation request message and a data deactivation accept message are exchanged between the mobile device 110 and the cellular network 120. With reference to FIG. 3, the data connection control module 310 controls the transmission and processing of the data deactivation request and accept messages.

After disconnecting from the registration APN, the mobile device 110 connects to the main APN network identified by the main APN. For example, at operation 274, the mobile device 110 transmits a data activation request to the cellular network 120. The data activation request in operation 274 is similar to the data activation request described in reference to operation 250. The cellular network 120 receives the data activation request and at operation 252 determines that the mobile device 110 is presently authorized to use the main APN (e.g., the SIM card of the mobile device 110 is now hot). Sometime after determining that the mobile device 110 is authorized for the main APN, the cellular network 120 transmits a data activation accepted message to the mobile device 110 at operation 278. Sometime after receiving the data activation accepted message, at operation 280 the mobile device 110 connects to the main APN network 140. After connecting to the main APN network 140, the mobile device 110 may use the services provided by the main APN network 140 (e.g., general Internet access, etc.). Thus, unlike prior mechanisms, a user of the mobile device 110 can use an unsubscribed cellular data connection to register for cellular data connection services (e.g., the Internet).

In an alternative embodiment, instead of the cellular network 120 transmitting a registration success or failure message as described in operation 270, the mobile device 110 waits some amount of time after selecting the service as described in operation 264, disconnects from the registration APN as described in operation 272, and then transmits a data activation request to the cellular network 120 for the main APN in a similar way as described in operation 250. It should be understood that the data activation request will not be accepted until the cellular network 120 has been updated to reflect the selection of service.

Referring back to FIG. 4, the cancel button 460 and/or the done button 470 are optionally displayed on the data connection service registration application 430. The cancel button 460, when selected by a user, causes the data connection service registration application 430 to exit and the corresponding data connection service registration procedure to end. Thus, when the cancel button 460 is selected, the data connection service registration procedure ends. In one embodiment, the cancel button 460 is not part of the service registration application 430 by itself. In other words, the functionality of the cancel button 460 is not a native feature of the registration application 430 interface, but may be incorporated through the use of one or more APIs.

The cancel button 460 may not be displayed during all stages of the service registration process. In one embodiment, the mobile telecommunications service provider associated with the data connection service registration application 430 defines whether the cancel button 460 appears on the service registration application 430 and/or at what stage in the service registration process the cancel button 460 appears.

The done button 470 allows the user to signify to the data connection service registration application 430 that the user has finished using the application 430. For example, the user may select the done button 470 when he or she is finished registering for data connection service. Similar to the cancel button 460, the done button 470 may not be included during all stages of the service registration process. In one embodiment, the mobile telecommunications service provider associated with the service registration application 430 defines whether the done button 470 appears on the service registration application 430 and/or at what stage in the service registration process the done button 470 appears.

In some embodiments the cancel button 460 and the done button 470 may be implemented through the use of one or more Application Programming Interface (APIs). An API is an interface implemented by a software component (hereinafter "API implementing software component") that allows a different software component (hereinafter "API calling software component") to access and use one or more functions, methods, procedures, data structures, and/or other services provided by the API implementing software component. For example, an API allows a developer of an API calling software component (which may be a third party developer) to leverage specified features provided by an API implementing software component. There may be one API calling software component or there may be more than one such software component. An API can be a source code interface that a computer system or program library provides in order to support requests for services from a software application. An API can be specified in terms of a programming language that can be interpretative or compiled when an application is built, rather than an explicit low level description of how data is laid out in memory.

The API defines the language and parameters that API calling software components use when accessing and using specified features of the API implementing software component. For example, an API calling software component accesses the specified features of the API implementing software component through one or more API calls (sometimes referred to as function or method calls) exposed by the API. The API implementing software component may return a value through the API in response to an API call from an API calling software component. While the API defines the syntax and result of an API call (e.g., how to invoke the API call and what the API call does), the API typically does not reveal how the API call accomplishes the function specified by the API call. Various function calls or messages are transferred via the one or more application programming interfaces between the calling software (API calling software component) and an API implementing software component. Transferring the function calls or messages may include issuing, initiating, invoking, calling, receiving, returning, or responding to the function calls or messages. Hence, an API calling software component can transfer a call and an API implementing software component can transfer a call.

By way of example, the API implementing software component and the API calling software component may be an operating system, a library, a device driver, an API, an application program, or other software module (it should be understood that the API implementing software component and the API calling software component may be the same or different type of software module from each other). The API calling software component may be a local software component (i.e., on the same data processing system as the API implementing software component) or a remote software component (i.e., on a different data processing system as the API implementing software component) that communicates with the API implementing software component through the API over a network. It should be understood that an API implementing software component may also act as an API calling software component (i.e., it may make API calls to an API exposed by a different API implementing software component) and an API calling software component may also act as an API implementing software component by implementing an API that is exposed to a different API calling software component.

As described above, the cancel button 460 and/or the done button 470 may be implemented using one or more APIs. For example, in one embodiment, a mobile telecommunications data connection service registration API is defined which allows developers (e.g., the mobile telecommunication service providers) to show and hide the cancel button 460 on the data connection service registration application 430.

Figure 5:
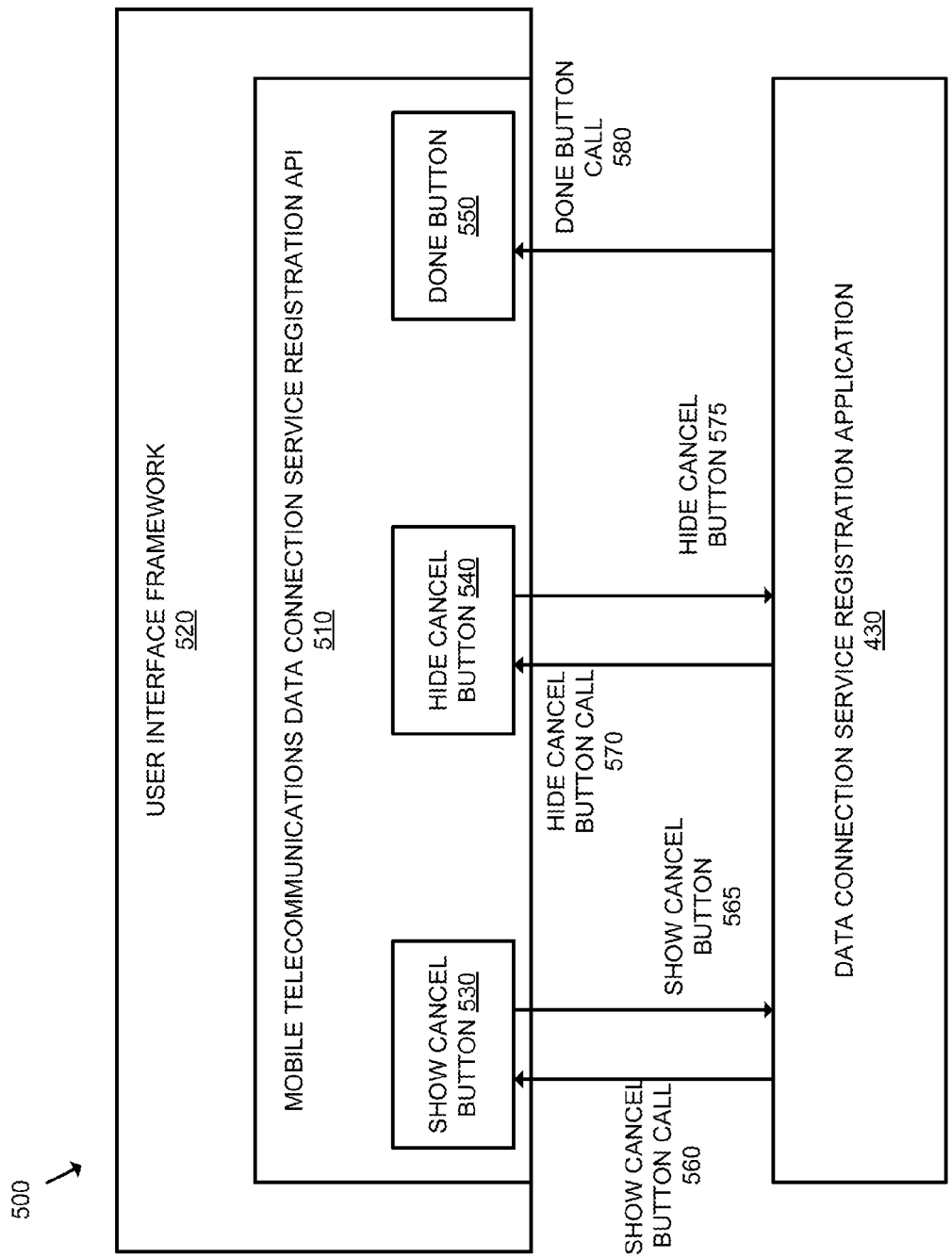
FIG. 5 is a block diagram illustrating an exemplary API architecture that may be used in some embodiments.

FIG. 5 is a block diagram illustrating an exemplary API architecture that may be used in some embodiments. As shown in FIG. 5, the API architecture 500 includes the user interface framework 520 (e.g., a framework that controls windowing, buttons, menus, and other user interface functions) that implements the mobile telecommunications service registration API 510. The mobile telecommunications service registration API 510 includes the show cancel button function 530, the hide cancel button function 540, and the done button function 550. The mobile telecommunications service registration API 510 specifies the calling convention for the service registration application 430 to call the functions 530, 540, and 550 and how those functions 530, 540, and 550 return their result(s) to the service registration application 430. In an embodiment, the functions 530, 540, and 550 are only available to service registration applications during service registration (thus they are not available to other types of applications).

Thus, the service registration application 430 makes API calls through the mobile telecommunications service registration API 510 to access and use the functions 530, 540, and 550. For example, regarding the show cancel button function 530, the service registration application 430 may make the show cancel button call 560 when it wants to show the cancel button 460 and provide its underlying functionality to the user (e.g., when it is appropriate for the service registration application 430 to provide the user the option to cancel the registration process and close the service registration application 430). The API 510 performs the show cancel button function 530, which leverages one or more functions or methods provided by the user interface framework 520, and the result is that the cancel button 460 is shown 565 on the service registration application 430. In one embodiment the show cancel button call 560 includes one or more parameters that allow the developer to indicate the location and/or size of the cancel button 460, while in other embodiments the show cancel button 460 will be located in a default position on the service registration application 430 and be a default size. Although not illustrated in FIG. 5, it should be understood that the underlying functionality of the cancel button 460 (e.g., to close the service registration application 430 when selected) is also provided by the user interface framework 520, and may also be used by the service registration application 430 through an API call.

Regarding the hide cancel button function 540, the service registration application 430 may make the hide cancel button call 570 when it wants to hide the cancel button 460 and thus prevent the service registration procedure to be cancelled by the user and the service registration application 430 from being closed by the user. The API 510 performs the hide cancel button function 540, which leverages one or more functions or methods provided by the user interface framework 520, and the result is that the cancel button 460 is hidden (e.g., removed from the service registration application 430).

Regarding the done button function 550, the service registration application 550 may make the done button call 580 responsive to a user selecting the done button 470. The API 510 performs the done button function 550, which leverages one or more functions or methods provided by the user interface framework 520, to close the service registration application window 430.

Account Status Notification

In some embodiments, mobile telecommunications service providers transmit account status update messages to the mobile devices to remind or notify the users of the current amount of service remaining on their account (e.g., the amount of minutes remaining, the amount of bandwidth remaining, etc.). The account can be a prepaid account or an account that may have a service limit before causing the user to pay extra. In some embodiments the messages are sent periodically (e.g., once a week, etc.) while in other embodiments the messages are sent when the remaining amount on the prepaid account is below a certain threshold. In some embodiments, the messages are SMS (Short Message Service) messages, which are in a format that the mobile device can interpret and display to the user.

With reference to FIG. 3, the data connection control module 310 receives these account status update messages, and may trigger the launch of the account status notification application 340. The account status notification application 340 displays the information corresponding to the account status update message. In some embodiments, the account status notification application 340 also includes options to add minutes or bandwidth to the account.

Location Based APN Service

Some embodiments may implement location based APNs when establishing data connections. A location based APN is a custom APN that is typically defined with a specific set of services for that location (e.g., state, city, neighborhood, place (e.g., hotel, resort, airport, coffee shop, school, etc.)). For instance, a location based APN may be defined for a resort that allows mobile devices to connect to resources specified by that resort (e.g., information related to services offered by the resort, information about the surrounding area, current weather, etc.). In some embodiments, the location based APNs may also give the option for the user to register for general Internet connectivity. For instance, an APN for an airport may be defined that allows all mobile devices to connect without a fee to a first set of services (typically restricted and specific to the airport, news, etc.) and allows for registered mobile devices to connect to a second set of services (e.g., general Internet connectivity). In this example, the first set of services may also provide the option for users to register for the second set of services.

In some embodiments, the mobile device 110 includes a database of location based APNs. The database of location based APNs may be periodically updated when the mobile device 110 is connected to a data network. In other embodiments, the cellular network 120 maintains a database of location based APNs. After receiving a message from the cellular network 120 that the mobile device 110 is not authorized for service with the main APN, the approximate location of the mobile device 110 is determined. For example, the approximate location may be determined through use of GPS functionality built within the mobile device 110 and/or determined through triangulation using cellular towers or Wi-Fi hotspots. If the mobile device 110 is in a location of one of the APNs, the user can be notified and can select to connect to the network identified by those APNs.

Figure 6:
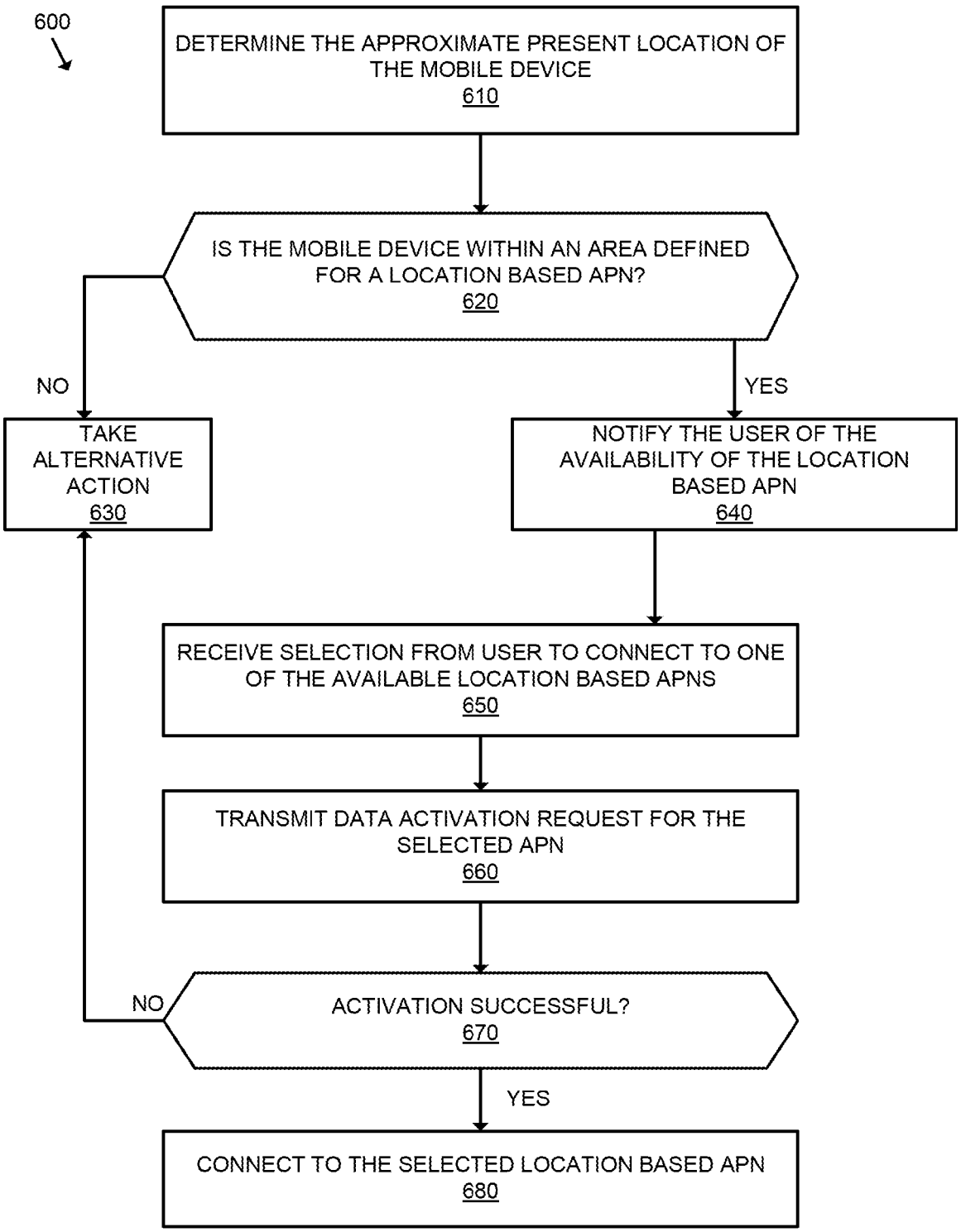
FIG. 6 is a flow diagram illustrating exemplary operations for connecting a mobile device to a mobile telecommunications network through a location based access point name according to one embodiment.

FIG. 6 is a flow diagram illustrating exemplary operations for connecting a mobile device to a mobile telecommunications network through a location based APN according to one embodiment. In one embodiment, the operations 600 are performed after determining that the mobile device 110 is not authorized for the main APN as described in operations 250-254 of FIG. 2. In another embodiment, the operations 600 are performed after the mobile device 110 has connected to the registration APN network as described in operation 262 of FIG. 2. In other embodiments, the operations 600 are performed periodically regardless of whether the mobile device has a current data connection.

The operations 600 begin at block 610, where the approximate present location of the mobile device is determined. The approximate location may be determined through use of GPS functionality built within the mobile device 110 and/or determined through triangulation using cellular towers and/or Wi-Fi hotspots. In some embodiments the mobile device 110 determines its approximate location and transmits it to the cellular network 120 while in other embodiments the mobile device 110 determines its approximate location and does not transmit it to the cellular network 120, while yet in other embodiments the cellular network 120 determines the approximate location of the mobile device 110. Flow moves from block 610 to block 620.

At block 620, it is determined whether the mobile device 110 is in an area defined for a location based APN. If the mobile device 110 is in an area defined for a location based APN, then flow moves to block 640, otherwise flow moves to block 630 where alternative action is taken (e.g., the process ends). In embodiments where the mobile device 110 maintains a database of location based APNs, the mobile device 110 may access that database to determine whether it is currently located within an area defined for that APN. In embodiments where the cellular network 120 maintains a database of location based APNs, the cellular network 120 may access that database with the determined approximate location of the mobile device 110 to determine whether the mobile device is within an area defined for a location based APN. It should be understood that it is possible for the mobile device 110 to be in the area for multiple location based APNs at a given time.

At block 640, the user of the mobile device is notified of the availability of the location based APN(s). For example, a window may be displayed on the mobile device which lists the location based APN(s) currently available. Details of the location based APN(s) may also be displayed (e.g., services that the location based APN(s) provides, etc.). Other notification mechanisms may be used (e.g., text message, email, graphical alert, etc.). The user is also given the option of selecting one of those location based APN(s). In those embodiments where the cellular network 120 maintains the database of location based APN(s), the cellular network 120 may transmit the details of the APNs in the area. Flow moves from block 640 to block 650.

At block 650, the user has selected to connect to one of the available location based APN(s). Flow moves from block 650 to block 660, where the mobile device 110 forms and transmits a data activation request, similar to the data activation request described in operation 250 of FIG. 2, to the cellular network 120. The cellular network 120 then determines whether the mobile device 110 is authorized for the selected location based APN (e.g., in a similar way as described in operation 252 of FIG. 2). The cellular network 120 may also validate the location of the mobile device 110 prior to granting authorization to the selected location based APN (e.g., based on triangulation of cell towers, etc.).

Flow moves from block 660 to block 670, where the mobile device determines whether activation was successful. For example, with reference to FIG. 2, the mobile device 110 may receive a data activation accepted message as similarly described in operation 278 of FIG. 2. If activation was successful, then flow moves to block 680 where the mobile device 110 connects to the selected location based APN network (e.g., in a similar way as described with reference to operation 262 of FIG. 2), otherwise flow moves to block 630 where alternative action is taken (e.g., the process ends). The mobile device 110 may use the services provided by the selected location based APN network once connected.

Figure 7:
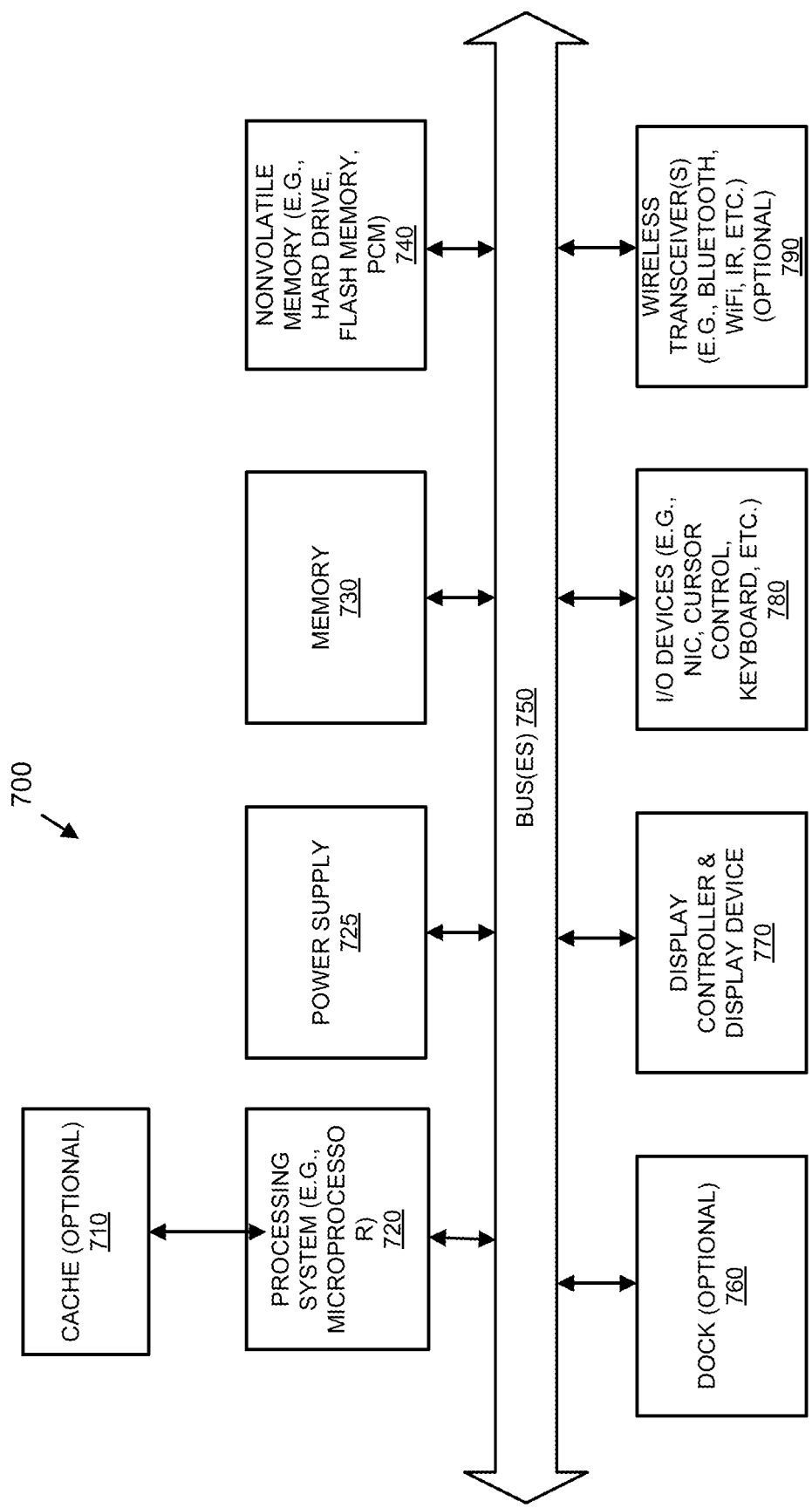
FIG. 7 is a block diagram illustrating an exemplary computer system which may be used in some embodiments of the invention.

FIG. 7 is a block diagram illustrating an exemplary computer system which may be used in some embodiments of the invention. For example, the exemplary architecture of the computer system 700 may be included in the mobile device 110. It should be understood that while FIG. 7 illustrates various components of a computer system, it is not intended to represent any particular architecture or manner of interconnecting the components as such details are not germane to the present invention. It will be appreciated that other computer systems that have fewer components or more components may also be used with the present invention.

As illustrated in FIG. 7, the computer system 700, which is a form of a data processing system, includes the bus(es) 750 which is coupled with the processing system 720, power supply 725, memory 730, and the nonvolatile memory 740 (e.g., a hard drive, flash memory, Phase-Change Memory (PCM), etc.). The bus(es) 750 may be connected to each other through various bridges, controllers, and/or adapters as is well known in the art. The processing system 720 may retrieve instruction(s) from the memory 730 and/or the nonvolatile memory 740, and execute the instructions to perform operations as described above. The bus 750 interconnects the above components together and also interconnects those components to the optional dock 760, the display controller & display device 770, Input/Output devices 780 (e.g., NIC (Network Interface Card), a cursor control (e.g., mouse, touchscreen, touchpad, etc.), a keyboard, etc.), and the optional wireless transceiver(s) 790 (e.g., Bluetooth, WiFi, Infrared, cellular telephony, GPS, etc.).

FIG. 8 is a block diagram illustrating an exemplary data processing system which may be used in some embodiments of the invention. For example, the data processing system 800 may be the mobile device 110. The data processing system 800 includes the processing system 820, which may include one or more microprocessors and/or a system on an integrated circuit. The processing system 820 is coupled with a memory 810, a power supply 825 (which includes one or more batteries) an audio input/output 840, a display controller and display device 860, optional input/output 850, input device(s) 870, and wireless transceiver(s) 830. It will be appreciated that additional components, not shown in FIG. 8, may also be a part of the data processing system 800 in certain embodiments of the invention, and in certain embodiments of the invention fewer components than shown in FIG. 8 may be used. In addition, it will be appreciated that one or more buses, not shown in FIG. 8, may be used to interconnect the various components as is well known in the art.

The memory 810 may store data and/or programs for execution by the data processing system 800. The audio input/output 840 may include a microphone and/or a speaker to, for example, play music and/or provide telephony functionality through the speaker and microphone. The display controller and display device 860 may include a graphical user interface (GUI). The wireless (e.g., RF) transceivers 830 (e.g., a WiFi transceiver, an infrared transceiver, a Bluetooth transceiver, a wireless cellular telephony transceiver, GPS transceiver etc.) may be used to communicate with other data processing systems. The one or more input devices 1170 allow a user to provide input to the system. These input devices may be a keypad, keyboard, touch panel, multi touch panel, etc. The optional other input/output 1150 may be a connector for a dock.

The techniques shown in the figures can be implemented using code and data stored and executed on one or more electronic devices (e.g., data processing systems, etc.). Such electronic devices store and communicate (internally and/or with other electronic devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device.

It should be apparent from this description that aspects of the present invention may be embodied, at least in part, in software. That is, the techniques may be carried out in a computer system or other data processing system in response to its processor, such as a microprocessor, executing sequences of instructions contained in memory, such as a ROM, RAM, mass storage, or a remote storage device. In various embodiments, hardware circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor.

Alternative Embodiments

While embodiments of the invention have been described in relation to cellular networks, types of networks may be used (e.g., Wi-MAX networks). Therefore, embodiments of the invention are not limited to cellular data connections and cellular networks.

While embodiments of the invention have been described in relation to a user registering for data connection service, other types of services may be registered using the registration site. For example, the registration site may allow users to register for (and/or change existing) text message services, voice services (e.g., selecting different voice plans and/or service options), or other services.

In some embodiments, responsive to a user attempting to use a service (e.g., text message service, voice service, etc.) which he/she is not currently subscribed for or does not have an appropriate number of credits to complete, the user is directed to a registration site to allow the user to register for service (e.g., a text message plan and/or a voice plan) and/or add credits (e.g., number of text messages, voice minutes, bandwidth, etc.) to an existing service. This registration site may be the same or may be different than the data connection registration site. The connection to the registration site may be performed differently depending on the connection state of the mobile device. For example, if the mobile device currently has a network connection capable of accessing the registration site (e.g., a Wi-Fi connection, a wired connection, a mobile telecommunications data connection, etc.), that network connection will be used to connect the mobile device to the registration site. However, if the mobile device does not currently have such a network connection (and one is not available), a data connection through a registration APN (similarly as described with reference to registering for data service as described above) may be established to direct the user to the registration site. The mobile device may be limited to accessing the registration site through the registration APN.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method performed by a mobile device to connect to a location-based cellular data connection service, comprising:
   determining whether the mobile device is authorized to access a main network that is identified by a main Access Point Name (APN); and
   if the mobile device is not authorized to access the main network:
     determining an approximate location of the mobile device;
     using the approximate location to determine whether at least one location-based APN out of a set of location-based APNs is associated with the mobile device, wherein each location-based APN identifies an associated network; and
     if at least one location-based APN is associated with the mobile device:
       allowing a user to select an associated location-based APN;
       transmitting a data activation request for the selected location-based APN;
       determining whether the data activation is successful; and
       if the data activation is successful, connecting to the associated network identified by the selected location-based APN.

2. The method of claim 1, wherein:
   each location-based APN is associated with a specific geographic area; and
   determining whether the mobile device is associated with a location-based APN comprises determining whether the approximate location is within a specific geographic area associated with the location-based APN.

3. The method of claim 2, wherein prior to determining the approximate location of the mobile device, the method further comprises connecting to a registration network that is identified by a registration APN.

4. The method of claim 3, wherein allowing the user to select an associated location-based APN comprises:
   displaying a list of all associated location-based APNs to the user; and
   receiving a selection of a location-based APN from the user.

5. A non-transitory machine-readable storage medium of a mobile device that provides instructions that, if executed by a processor of that mobile device, will cause said processor to perform operations for connecting to a location-based cellular data connection service, comprising:
   determining whether the mobile device is authorized to access a main network that is identified by a main Access Point Name (APN); and
   if the mobile device is not authorized to access the main network:
     determining an approximate location of the mobile device;
     using the approximate location to determine whether at least one location-based APN out of a set of location-based APNs is associated with the mobile device, wherein each location-based APN identifies an associated network; and
     if at least one location-based APN is associated with the mobile device:
       allowing a user to select an associated location-based APN;
       transmitting a data activation request for the selected location-based APN;
       determining whether the data activation is successful; and
       if the data activation is successful, connecting to the associated network identified by the selected location-based APN.

6. The non-transitory machine-readable storage medium of claim 5, wherein:
   each location-based APN is associated with a specific geographic area; and
   determining whether the mobile device is associated with a location-based APN comprises determining whether the approximate location is within a specific geographic area associated with the location-based APN.

7. The non-transitory machine-readable storage medium of claim 6, wherein prior to determining the approximate location of the mobile device, the method further comprises connecting to a registration network that is identified by a registration APN.

8. The non-transitory machine-readable storage medium of claim 7, wherein allowing the user to select an associated location-based APN comprises:

displaying a list of all associated location-based APNs to the user; and receiving a selection of a location-based APN from the user.

9. A mobile device comprising a memory for storing program code and a processing system for processing the program code to perform operations to register for cellular data connection service provided by a mobile telecommunications service provider, the operations comprising:

determining via an authorization procedure whether the mobile device is authorized to access a main network that is identified by a main Access Point Name (APN); and if the mobile device is not authorized to access the main network:

determining via a GPS transceiver an approximate location of the mobile device;

using the approximate location to determine whether at least one location-based APN out of a set of location-based APNs is associated with the mobile device by accessing a database of location-based APNs in the mobile device, wherein each location-based APN identifies an associated network; and if at least one location-based APN is associated with the mobile device:

allowing a user to select via a Graphical User Interface (GUI) an associated location-based APN;

transmitting via a wireless transceiver a data activation request for the selected location-based APN;

determining via a data connection control module whether the data activation is successful; and if the data activation is successful, connecting via a data connection service registration application to the associated network identified by the selected location-based APN.

10. The mobile device of claim 9, further comprising:

receiving a selection via the GUI from the user for cellular data connection service provided by the mobile telecommunications service provider;

communicating via the wireless transceiver that selection to the cellular data connection service registration site; and establishing a cellular data connection via the data connection service registration application with the mobile telecommunications service provider.

11. The mobile device of claim 10, wherein prior to determining the approximate location of the mobile device, the method further comprises connecting via the data connection service registration application to a registration network that is identified by a registration APN.

12. The mobile device of claim 11, wherein allowing the user to select an associated location-based APN comprises:

displaying via the GUI a list of all associated location-based APNs to the user; and receiving via the GUI a selection of a location-based APN from the user.

\* \* \* \* \*